April 6, 1937.  J. T. LANCASTER  2,075,903
METHOD OF AND MACHINE FOR INSERTING FASTENINGS
Filed Oct. 29, 1934  6 Sheets-Sheet 4

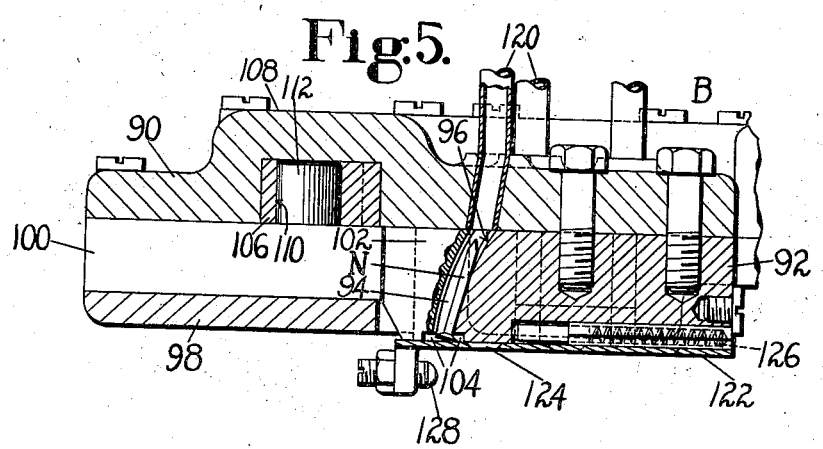
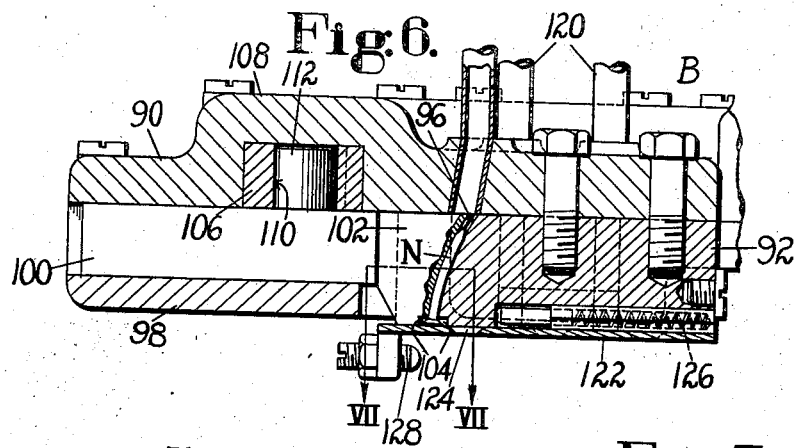
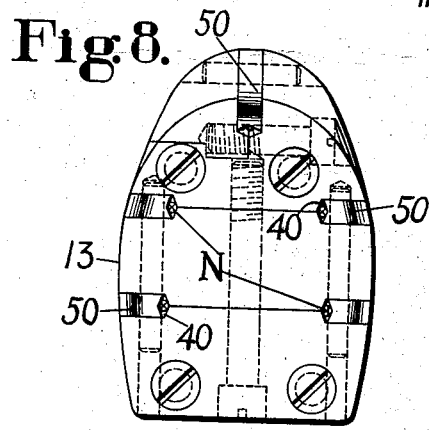
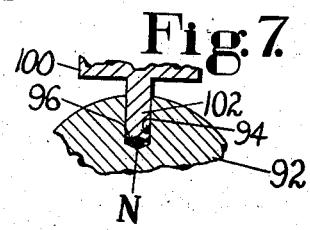

April 6, 1937.  J. T. LANCASTER  2,075,903
METHOD OF AND MACHINE FOR INSERTING FASTENINGS
Filed Oct. 29, 1934  6 Sheets-Sheet 6
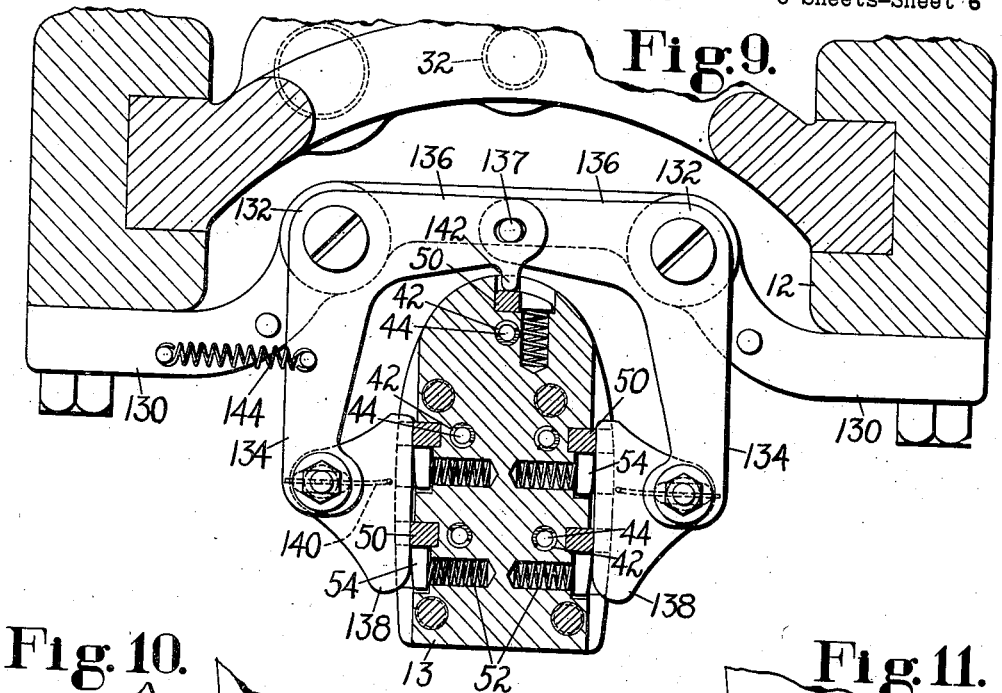
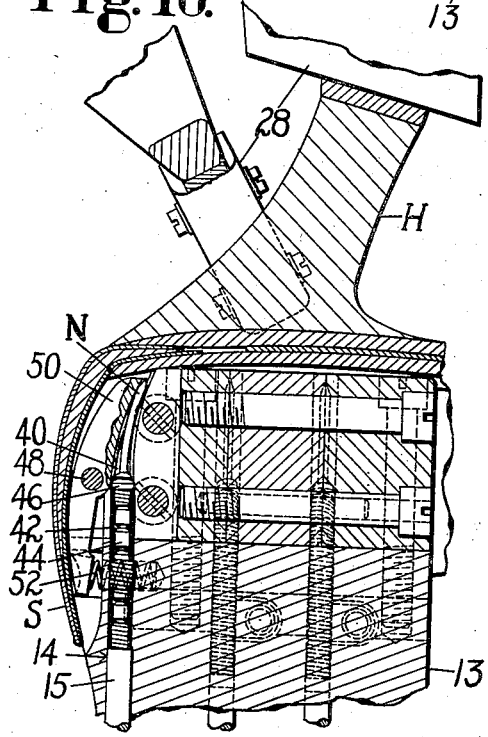
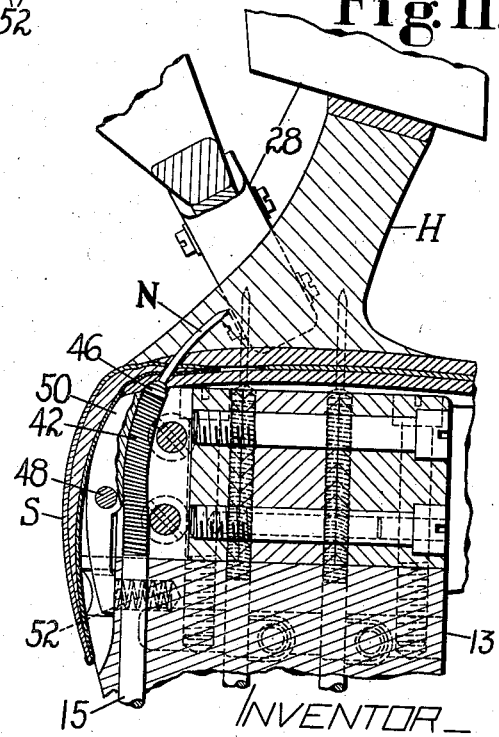
INVENTOR
John T. Lancaster
By his Attorney
Harlow M. Davis Patented Apr. 6, 1937

2,075,903

UNITED STATES PATENT OFFICE 2,075,903

METHOD OF AND MACHINE FOR INSERTING FASTENINGS

John T. Lancaster, Newton, Mass., assignor to United Shoe Machinery Corporation, Paterson, N. J., a corporation of New Jersey Application October 29, 1934, Serial No. 750,408

42 Claims. (Cl. 1—32)

My invention relates to the insertion of such fastenings as nails, it being of particular utility in connection with the attachment of heels to shoes.

In securing heels to shoes by fastenings driven from within said shoes, it is desirable to locate the points of insertion close to the periphery of the heel-seat-end of the heel in order that a tight crease may be produced. But in doing this difficulty arises, especially with heels of the Louis type having a heavy pitch, because of the tendency for the points of the fastenings to break through the side-walls of the heel. My invention has as an object the performance of such operations upon fastenings as will allow their insertion at the desired locations while they are still kept safely within the heel-wall. For the attainment of this object, a feature of the invention may be found in a method of attaching together portions of shoes which consists in bending or otherwise forming one or more nails or similar fastenings in a gradual curve between their opposite extremities, or in such a manner as to cause them to follow curved paths upon insertion, delivering them from forming positions to inserting positions and driving the delivered fastenings into the work. This work may be a shoe and its heel mounted upon a work-supporting jack, through which jack the curved fastenings are driven from within the shoe through the heel-seat and into the heel. When the fastenings are thus formed and inserted, they may be caused to follow paths close to the peripheral wall of the heel and almost uniformly spaced from it, so even when driven close to the crease the points will not emerge through the side-wall.

Another feature of the invention concerns a machine which may be utilized in the performance of my improved method. With inserting mechanism, which may include a jack or work-support having fastening-receiving passages, shown herein as curved and containing reciprocatory flexible drivers, I combine mechanism to which fastenings are supplied for forming and from which the formed fastenings are delivered by means which temporarily retains and releases them. The forming means may have complemental bending members, which I have chosen to illustrate as consisting of a concave anvil and a co-operating convex plunger, with which bending members is associated a shutter or other movable member controlling the delivery of the fastenings to the inserting mechanism. Preferably, this forming mechanism operates simultaneously on a plurality of fastenings, which are thereafter simultaneously driven by the inserting mechanism in accordance with a definite design. The fastenings may be formed in the correct angular position about their longitudinal axes for driving, and to guard against their displacement after delivery to the inserting mechanism and to direct them during insertion, fingers or like members are provided for contact with the fastenings, to hold them in the delivered positions in the receiving passages. With the holding members is associated means to render them ineffective, so the fastenings may be supplied to the receiving passages without interference. In the particular apparatus disclosed, there is mounted upon a frame nail-bending mechanism, a work-supporting jack, a reciprocatory plunger or member which may actuate nail-inserting drivers in the jack, and work-clamping means, the jack being movable between a nail-receiving position at the bending mechanism and an operating position at the plunger and clamping means. The nails may be delivered through tubes to the bending mechanism, formed thereby, supplied to the driver-passages in the jack then in co-operation with it, the jack with the formed nails being thereupon transferred to a position for co-operation with the plunger and clamping means for the attaching operation, and with the nails held against accidental displacement.

In the accompanying drawings.

Figure 3:
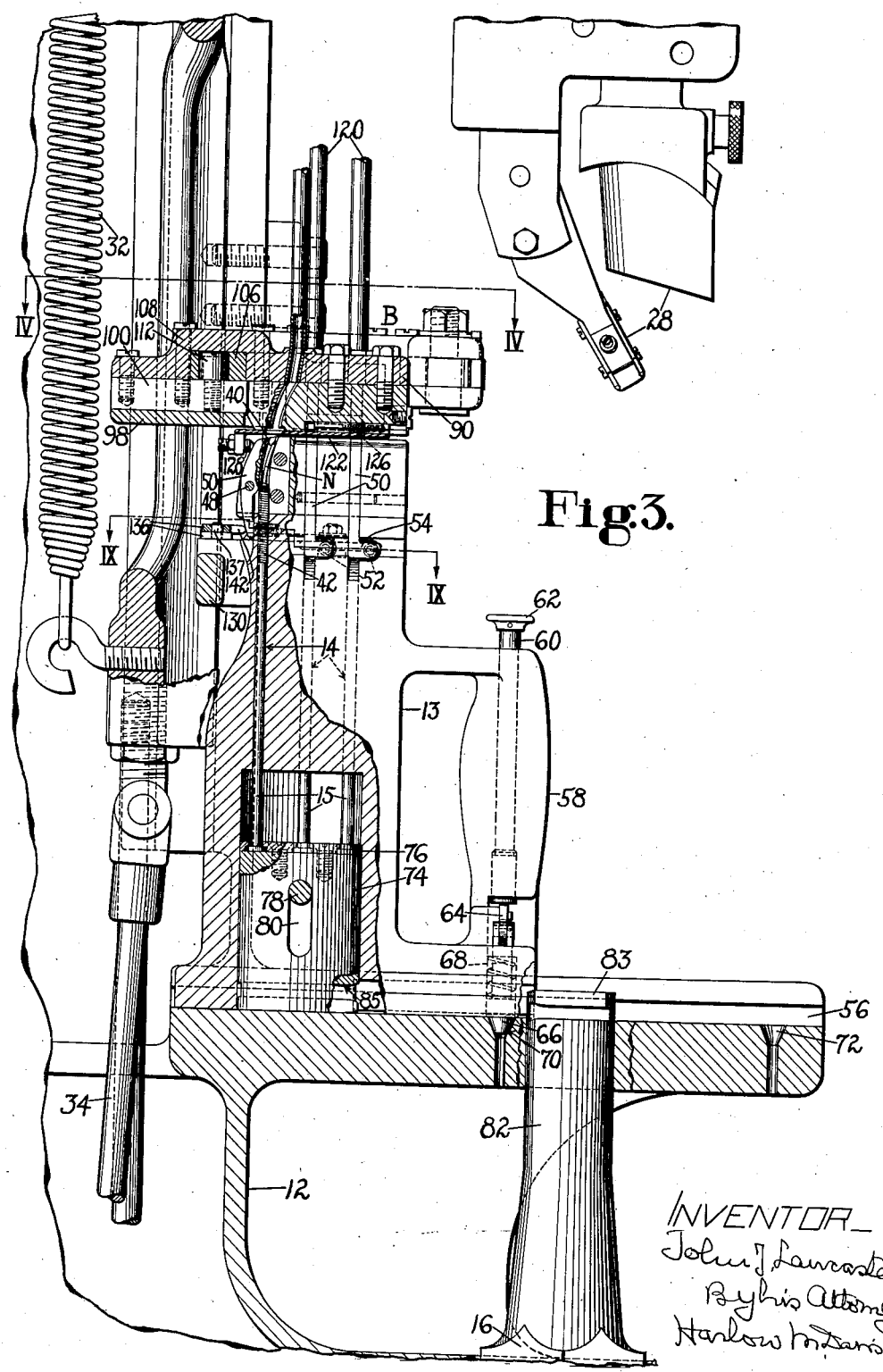
Fig. 3 is a broken side elevation of a like portion of the machine.
Figure 4:
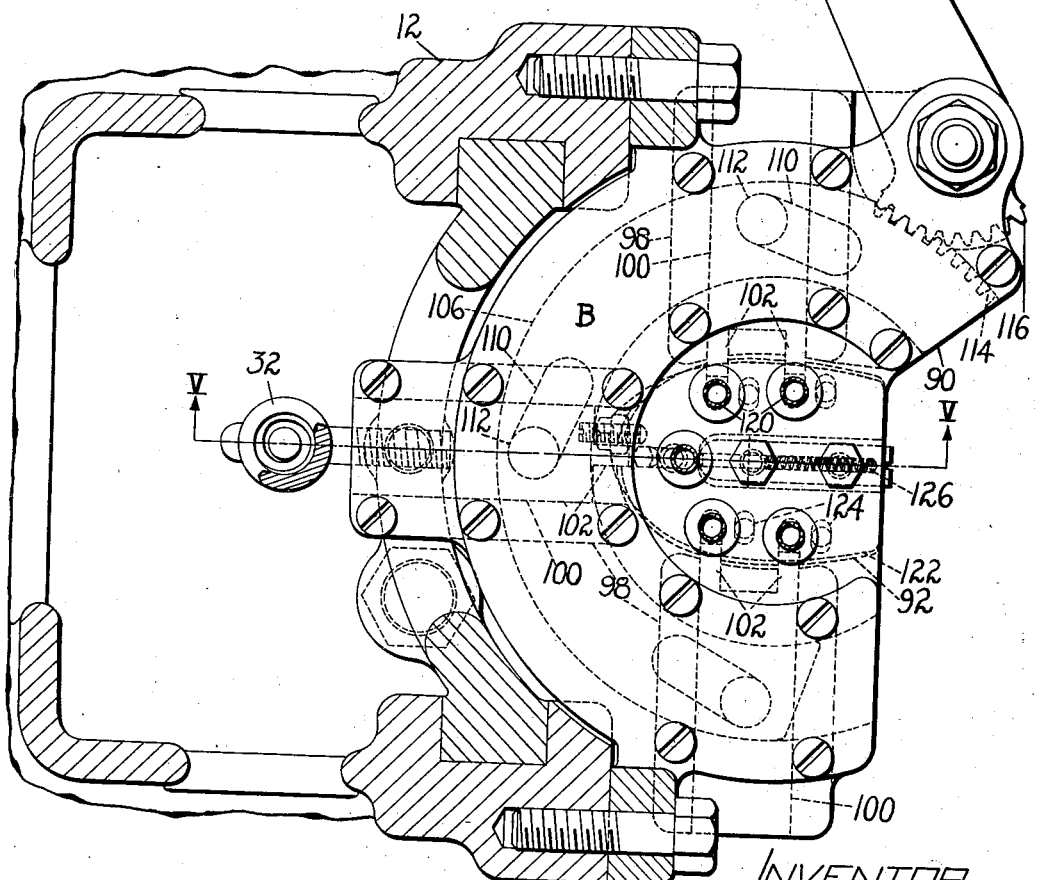

Fig. 4, a horizontal section on the line IV—IV of Fig. 3, showing the nail-bending mechanism;

Figs. 5 and 6 are vertical sections on the line V—V of Fig. 4, with the elements respectively in receiving and bending positions;

Fig. 7, a sectional detail on the line VII—VII of Fig. 6;

Fig. 8, a top plan view of the jack;

Fig. 9, a horizontal section on the line IX—IX of Fig. 3; while

Figs. 10 and 11 are central, vertical sectional details through the top of the jack, they respectively illustrating the elements before and after the driving of the nails.

I have chosen to disclose my invention as applied to such an inside-nailing machine for attaching heels to shoes as that made the subject of Letters Patent of the United States No. 1,288,521, Cosgrove, December 24, 1918. In this, a frame 12 supports nail-inserting mechanism comprising a jack 13 containing nail-receiving passages 14 in which operate drivers 15. The drivers are actuated, by a reciprocatory plunger 16 guided in the frame, to force nails carried on their upper extremities through the heel-seat of a shoe and into a heel mounted upon the jack. The plunger may be driven through a link 18 from a crank-shaft 20, rotated through single-revolution clutch mechanism 22 by power applied to a pulley 24, and controlled by a hand-lever 26. The nail-inserting force of the drivers is resisted by heel-abutment members 28, 28 carried by a head 30 arranged to slide vertically in the frame. The head is held normally up to permit the application of work to the jack by a spring 32 and is depressed into work-clamping relation by connections 34 (Fig. 3) to a treadle 36.

Considering now the elements peculiar to the present invention, the lower portion of the jack-passages 14 and the corresponding portion of the drivers 15 are straight, as in the machine of the previously-mentioned patent. But the upper portion of each of the passages at 40 is gradually curved upwardly and inwardly (Fig. 10), the radius of curvature being relatively long and with its center located toward the front of the jack-body. To allow the drivers to act properly in these curved passages, the portions movable therein are flexible, each portion terminating in a helical spring 42 within which is a series of force-transmitting cylinders or balls 44, there being at the upper end of the series a contact member 46 to support the nails to be driven.

Curved nails are to be delivered to the passages 40 in predetermined positions and to maintain these positions undisturbed, as during movement which may be imparted to the jack and during the driving of the nails, I associate nail-holding means with each passage. In the present instance, there is pivoted at 48 just outside each passage a finger 50, the upper extremity of which is forced through a vertical slot in the passage-wall by a spring 52 seated in a horizontal bore in the jack-body and acting against a lateral projection 54 from the opposite end of the finger. As the nails rest with their heads upon the drivers, the fingers engage them near the points, preventing displacement of said nails either about their axes of transversely of the passages. The opposite walls of the jack-passages and fingers are shown as of obtuse V-form (Fig. 8), so the nails will be more firmly held and more accurately guided during driving. The fingers are withdrawn from the driver-passages to avoid interference with the delivery of nails thereto by means which will later be described.

Figure 1:
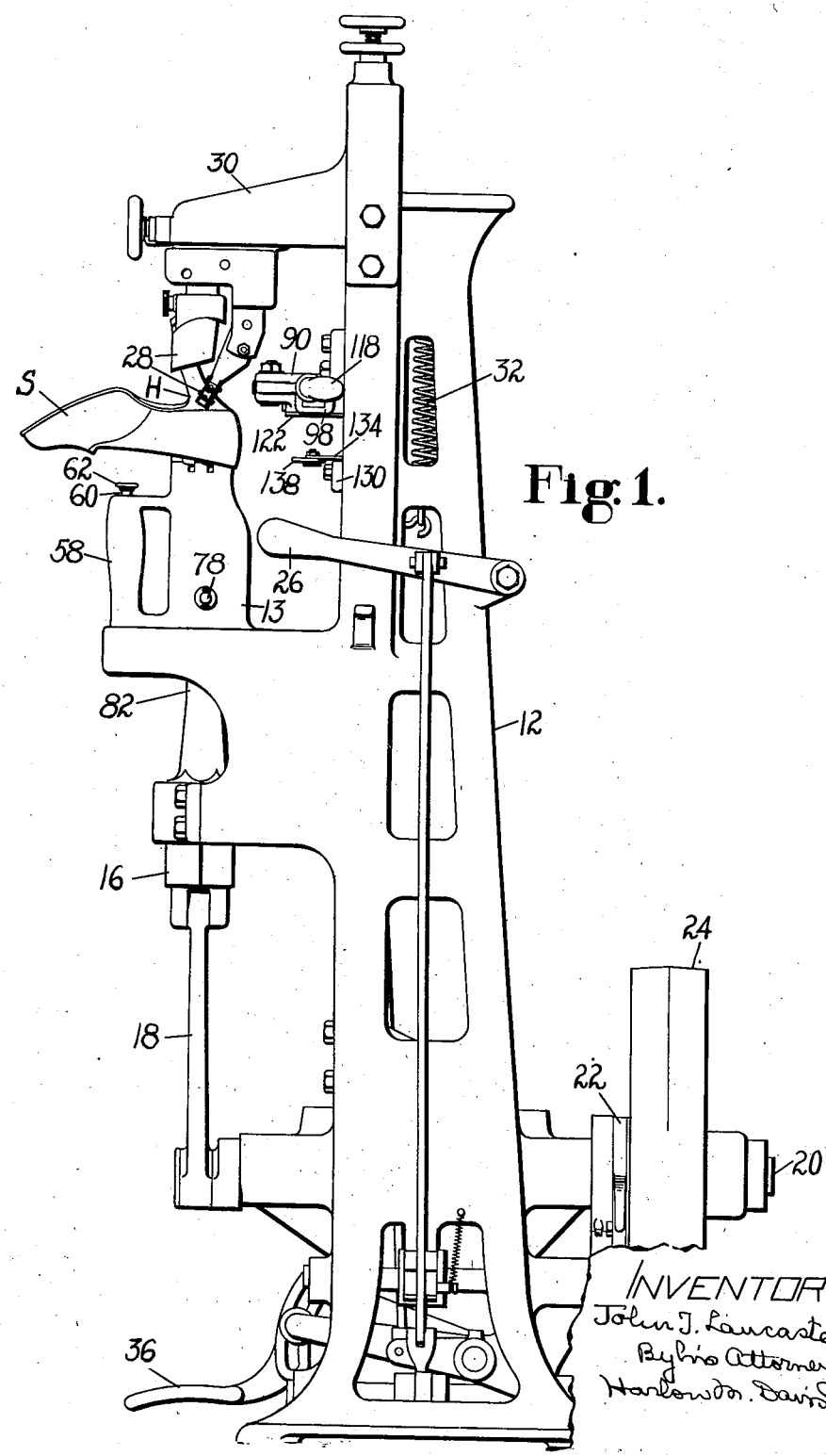
Fig. 1 illustrates in side elevation a particular form of my improved heel-attaching machine.
Figure 2:
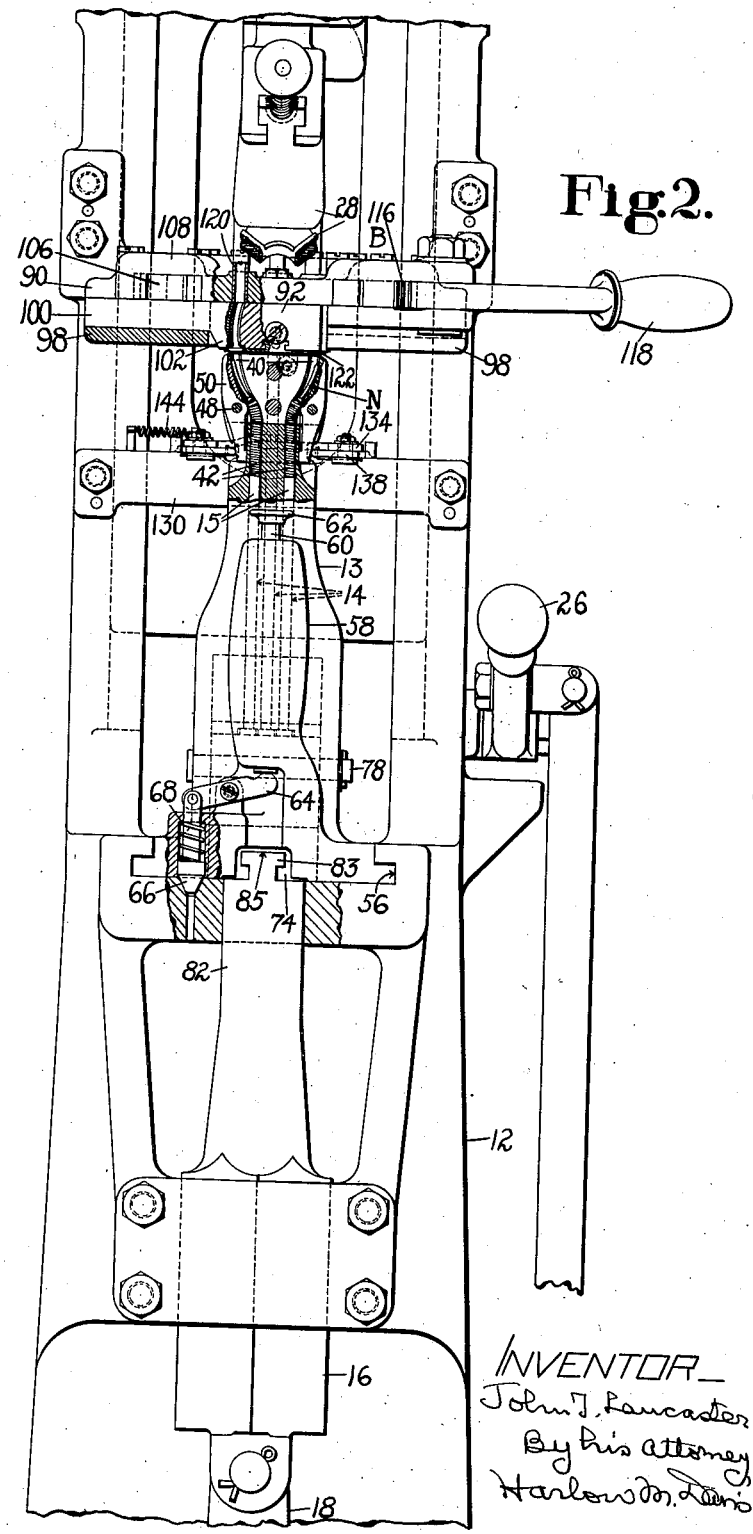
Fig. 2 shows the operating elements of the machine in front elevation, parts being broken away.

It is desired that the jack 13 shall occupy two definite positions, one at which nails are delivered to its passages, and another in which said nails are driven into the work. It is therefore arranged to slide in horizontal ways 56, a handle 58 being provided at its outer side for the operator to grasp. In the handle a rod 60 is mounted to reciprocate vertically, the upper end having a head 62 upon which the operator may press, and the lower end engaging a lever 64 (Fig. 2) pivoted in the base of the jack and carrying a latch 66 urged downwardly by a spring 68. The jack is located in the correct nail-receiving-position by the engagement of this latch with a depression 70 in the frame. Its engagement with a similar depression 72 locates the jack in operating position, in which, after the work has been jacked, it is properly alined with the members 28 so it may be clamped for the nailing of the heel. In this operating position, the drivers 15 and their flexible ends are prepared for operation by the plunger 16. In the jack-body, a carrier-block 74 is arranged to reciprocate, having secured to its upper face by a perforated plate 76 the drivers 15. It may be held against turning in the jack, and also limited as to the extent of its downward movement, by a horizontal rod 78 fixed across the jack and passing through a vertical slot 80 in the carrier. When the jack is latched at the depression 72 in operating position, the carrier 74 is in registration with an upper contact-head 82 of the plunger 16, and a T-projection 83 upon the head lies within a T-slot 85 in said carrier. As the crankshaft 20 rotates, the head is forced against the carrier, so elevating this that the ends 46 of the drivers rise somewhat above the work-supporting face of the jack-top, the nails which they carry being driven into the work and their heads sunk in the insole. Descent of the head 82 returns the carrier and drivers to their initial positions.

When the jack is latched at 70 in its nail-receiving position, it co-operates with nail-bending mechanism B. This is shown in detail in Figs. 4 to 7. Secured to the front of the frame 12 is a generally horizontal plate 90 having fixed to its under side at its forward central portion a die-block 92 in the periphery of which are the recesses 94 each having in its inner side a convex wall 96. Over this wall, between the side-walls of the recess, a heel-attaching nail is to be bent. It is preferable that the nail shall be gradually curved between its head and point to such a degree that when driven into a heel of the character commonly attached by inside-nailing machines the portion within the heel shall be approximately equidistant throughout its length from the peripheral heel-wall. The die-wall 96 is consequently correspondingly curved. As shown in Fig. 7, each wall 96 is V-shaped in transverse section so the nails are centered in the recesses. There is one of these nail-holding recesses for each of the jack-passages, they being arranged in accordance with the same nailing design. In the present case there are five of these recesses. Attached to the under side of the plate 90 about the die-block are three channel members 98 in each of which a die-plunger 100 is arranged to slide. I have shown one of these plungers for each pair of side recesses 94 and one for the rear recess. Projecting from the plungers into the recesses 94 are male die members 102, of which there are two for each side plunger and one for the rear plunger. The operating ends of these members complement the walls 96 of the recesses, being concave and similarly curved and provided with a nail-centering V-depression. At the lower extremity of the passage formed by the elements 96 and 102, the forming members are shown as cut away at 104 to give spaces to receive the heads of the nails without subjecting them to pressure. The die-plungers 100 may be moved simultaneously into and out of nail-bending position by an actuating segment 106 movable in a recess formed in the under side of the plate 90 which has an arcuate boss 108 to accommodate said recess. In the segment are three cam-slots 110 receiving projections 112 from the respective plungers 100. The periphery of the segment is toothed at 114 and with these teeth meshes a gear-segment 116 upon the inner extremity of a lever 118 fulcrumed upon the plate 90. This lever is herein shown as manually operated, though obviously power might be applied at the proper time-intervals by the machine.

When the elements of the mechanism B are in the positions illustrated in Figs. 4 and 5, the cam-segment 106 has withdrawn the plungers 100 so the recesses 94 are fully open to receive the nails to be bent. Said nails are supplied through tubes 120 extending through the plate 90 in vertical alinement with the respective recesses. The supply may be in successive loads of five nails each from some such distributing mechanism as that disclosed in Letters Patent of the United States No. 1,947,770, MacKenzie, February 20, 1934, the present plate 90 corresponding to the foot-plate of the patent. When thus delivered, the nails fall heads down upon and are temporarily retained by a reciprocatory shutter 122 guided upon the under side of the die-block 92. In this shutter is a set of openings 124, corresponding in arrangement to the design of the die-recesses 94 but normally held out of registration with the recesses by a spring 126 interposed between a surface of the block and the outer extremity of the shutter. While the nails are thus held between the die members, the lever 118 may be swung in a clockwise direction as viewed in Fig. 4, causing the cam-slots 110 to actuate the plungers 100, forcing all the die members 102 against the nails, which are thereby bent longitudinally of their axes to the form of the die-walls 96, and then left free upon the shutter by the restoration of the lever to its normal position and the consequent withdrawal of the plungers. At the inner end of the shutter is a depending lug through which is threaded an adjustable contact-screw 128. When the jack is moved by the operator to its nail-receiving position, its rear wall strikes the screw, carrying the shutter back until the openings 124 are alined with the die-recesses. The formed nails are therefore released to descend into the jack-passages 40.

Since the passages 40 are normally closed by the nail-holding fingers 50, these must be withdrawn for the nail-supplying operation. Fixed to the frame at each side of the receiving position of the jack is a bracket 130 (Fig. 9) upon which is fulcrumed two bell-crank-levers 132 each provided with an arm 134 extending at one side of the path of the jack and an arm 136 lying at the rear of the jack. The adjacent ends of the arms 136 are joined by a slot-and-pin connection 137, so oscillation of one member will oscillate the other. Each arm 134 has pivoted upon its forward extremity a contact-head 138 held yieldably by a spring 140 in a position for engagement with the fingers 50 at that side of the jack and below their pivotal points. One of the lever-arms 136 has a forward projection 142, so situated that when the jack is in the rear or nail-receiving position, said projection receives contact of the rear finger 50. This engagement not only swings the upper nail-holding portion of the rear finger out to free the jack-passage 40, but also turns both levers 132 through the connection 137. The result of this is to carry the heads 138 against the lower extremities of both pairs of side-fingers 50. Thus, all the jack-passages are placed in condition for the reception of nails from the bending mechanism B. Upon movement of the jack toward the forward operating position, a spring 144 joined to one of the levers 132 restores said levers to their normal relation.

Considering the use of the apparatus, it may be assumed that the jack 13 is in operating position latched in the depression 72, the heeling of a shoe having been completed and the work removed. The bending lever 118 is as appears in Fig. 4, the members 102 which it actuates being separated from the bending recesses 94 of the die-block 92. A load of nails N is now delivered heads down by the distributor through the tubes 120 into the bending recesses where they rest upon the shutter 122. The operator swings forward the lever, causing the cam-segment 106 to force in all the members 102, and the nails are simultaneously bent thereby to the curvature of the walls 96, whereupon the lever is restored to its normal position leaving the bent nails free upon the shutter. The rod 60 is now depressed to unlatch the jack, and this is shifted rearwardly, allowing the latch to engage the depression 70. This brings the mouths of the jack-passages 40 into registration with the die-recesses, and at the same time two other results are accomplished. Engagement of the rear finger 50 with the projection 142 carries said finger out of its passage, and, through the levers 132, withdraws the side fingers by contact of the heads 138. Further, the action of the jack upon the shutter-screw 128 alines the openings 124 with the bending recesses. Therefore, the nails are released and, maintained against turning about their axes by the V-form of the walls, enter the jack-passages and come to rest upon the drivers in the same relation as that in which they were formed. The operator may now free the jack-latch from the opening 70 and draw the jack forward to the operating position, where it is again latched in engagement with the plunger 82. As it leaves the bending mechanism the shutter is closed by its spring 126 and the rear finger 50 permitted to move into the nail-engaging position, while the spring 144 withdrawing the members 138 also frees the side-fingers. All the nails are consequently grasped by the fingers and held positively against displacement. The operator jacks a shoe S, places a heel H upon its heel-seat, and lowers the head 30 by the treadle 36 so the members 28 clamp the work. Movement of the lever 26 starts a power-cycle of the machine, and the drivers 15 are elevated, their flexible upper extremities following the curvature of the passages 40, each nail being guided in a very definite path by the engagement of the corresponding finger with it. Because of this, when the nail-points enter the work, substantially the same path is followed, and this, determined by the curvature of the nails, is such, as appears in Fig. 11, as to keep all portions of the nail-shanks approximately uniformly spaced from the peripheral wall of the heel. With the certainty that this relation will obtain, the points of nails may be so close to the heel-seat-edge of the heel that a tight, firm crease may be attained with certainty. Finally, at the termination of the power-cycle, the operator frees the treadle 36, the spring 32 raises the pressure-head, the work is removed from the jack, and the machine is ready for another operation.

Having described my invention, what I claim as new and desire to be secured by Letters Patent of the United States is:

1. The method of attaching together portions of shoes, which consists in bending a fastening to a substantially gradual curve between its opposite extremities, transferring the thus-formed fastening from the bending position to an inserting position, and driving the transferred fastening into the work.

2. The method of attaching together portions of shoes, which consists in forming a plurality of fastenings to cause them upon insertion to follow curved paths, freeing the thus-formed fastenings and allowing them to fall from the forming positions to inserting positions, and driving the delivered fastenings into the work.

3. The method of attaching together portions of shoes, which consists in forming a plurality of fastenings to cause them upon insertion to follow curved paths, freeing the thus-formed fastenings and allowing them to fall from the forming positions to inserting positions while maintaining their angular relation about their axes, grasping the fallen fastenings in similar angular relation at the inserting positions, and driving the fastenings from such positions into the work.

4. The method of attaching a heel to a shoe, which consists in bending nails to substantially gradual curves between the heads and points, arranging the thus-bent nails with their centers of curvatures inward and supported within the shoe, mounting a heel upon the heel-seat of the shoe, and driving the nails through the heel-seat into the heel.

5. The method of attaching a heel to a shoe, which consists in simultaneously bending a plurality of nails to curved form, simultaneously placing the thus-bent nails in position for association with a shoe and with their centers of curvature inward, establishing a nailing relation between the shoe and positioned nails, mounting a heel upon the shoe, and simultaneously driving the nails through the heel-seat into the heel.

6. The method of attaching heels to shoes, which consists in bending a plurality of nails to curved form, delivering the thus-formed nails to a jack, mounting a shoe and its heel upon the jack, and driving the nails from the jack through the heel-seat into the heel.

7. The method of attaching heels to shoes, which consists in simultaneously forming a plurality of nails, delivering the thus-formed nails simultaneously from their forming positions to a jack, mounting a shoe and its heel upon the jack, and driving the nails from the jack through the heel-seat into the heel.

8. In a fastening-inserting machine, fastening-inserting mechanism, fastening-forming mechanism, means arranged to supply fastenings to the forming mechanism, and means for temporarily retaining the fastenings in forming position and releasing the formed fastenings for delivery to the inserting mechanism.

9. In a fastening-inserting machine, fastening-inserting mechanism, fastening-forming mechanism, means arranged to supply fastenings to the forming mechanism, means for temporarily retaining the fastenings in forming position and releasing the formed fastenings for delivery to the inserting mechanism, and means associated with the inserting mechanism for holding the nails in their delivered position.

10. In a fastening-inserting machine, fastening-inserting mechanism, fastening-forming mechanism, means arranged to supply fastenings to the forming mechanism, and means controlled by the inserting mechanism for temporarily retaining the fastenings in forming position and releasing the formed fastenings for delivery to the inserting mechanism.

11. In a fastening-inserting machine, fastening-inserting mechanism, fastening-forming mechanism having complemental bending members, means arranged to supply fastenings between the bending members, and means for temporarily retaining the fastenings between the bending members and for releasing the bent fastenings for delivery to the inserting mechanism.

12. In a fastening-inserting machine, fastening-inserting mechanism, fastening-forming mechanism having a concave anvil and a co-operating convex plunger, means arranged to supply fastenings between the anvil and plunger, and fastening-retaining and releasing means co-operating with the forming mechanism and controlling delivery to the inserting mechanism.

13. In a fastening-inserting machine, means for simultaneously inserting a plurality of fastenings in accordance with a definite design, mechanism for simultaneously forming the fastenings to be inserted, and means for simultaneously delivering the formed fastenings to the inserting mechanism.

14. In a fastening-inserting machine, means for simultaneously inserting a plurality of fastenings, mechanism for simultaneously forming the fastenings to be inserted, means for simultaneously delivering the formed fastenings to the inserting mechanism, and means contacting with each fastening for holding it in its delivered position.

15. In a fastening-inserting machine, means for simultaneously inserting a plurality of fastenings in accordance with a definite design, bending mechanism acting upon the plural fastenings, and means for delivering the bent fastenings to the inserting mechanism.

16. In a fastening-inserting machine, means for simultaneously inserting a plurality of fastenings, a stationary bending member, a movable bending member for each fastening co-operating with the stationary member, and means for supporting the gang of fastenings in bending position and releasing them when bent for delivery to the inserting mechanism.

17. In a fastening-inserting machine, means for simultaneously inserting a plurality of fastenings, a stationary bending member, a movable bending member for each fastening co-operating with the stationary member, and means for supporting the gang of fastenings in bending position and releasing them when bent for delivery to the inserting mechanism, the release being controlled by an element of the inserting mechanism.

18. In a heel-attaching machine, means for nailing a heel upon a shoe, and nail-bending means delivering to the nailing means.

19. In a heel-attaching machine, means for nailing a heel upon a shoe, nail-bending means delivering to the nailing means, and means arranged to supply nails to the bending means.

20. In a heel-attaching machine, means for nailing a heel upon a shoe, means for forming simultaneously a heel-attaching gang of nails, and means for simultaneously delivering the formed nails to the nailing means.

21. In a heel-attaching machine, a support for a shoe and its heel, nail-drivers co-operating therewith, and nail-bending mechanism delivering to the support.

22. In a heel-attaching machine, a support for a shoe and its heel, nail-drivers co-operating therewith, nail-bending mechanism delivering to the support, and a movable nail-retaining and releasing member co-operating with the bending mechanism.

23. In a heel-attaching machine, a jack provided with passages, drivers movable in the passages, and a nail-forming member having nail-receiving recesses corresponding to the jack-passages and delivering thereto.

24. In a heel-attaching machine, a jack provided with passages, a driver movable in each passage, a nail-holding member movable in each passage, and a nail-forming member having nail-receiving recesses corresponding to the jack-passages and delivering thereto.

25. In a heel-attaching machine, a jack provided with passages, a driver movable in each passage, a nail-holding member movable in each passage, means for moving the holding members to free the passages, and a nail-forming member having nail-receiving recesses corresponding to the jack-passages and delivering thereto.

26. In a heel-attaching machine, a jack provided with curved passages, drivers movable in the passages, nail-bending means, and means for delivering the bent nails to the jack-passages.

27. In a heel-attaching machine, a jack provided with passages, drivers movable in the passages, a nail-forming member having nail-receiving recesses corresponding to the jack-passages and delivering thereto, and nail-tubes terminating at the recesses.

28. In a heel-attaching machine, a jack provided with curved passages, flexible drivers movable in the passages, nail-bending means, and means for delivering the bent nails to the jack-passages.

29. In a heel-attaching machine, a jack provided with curved passages, drivers movable in the passages, and means for bending the attaching nails to curved form generally corresponding to the curvature of the passages and delivering them thereto.

30. In a heel-attaching machine, a jack provided with curved passages, drivers movable in the passages, a nail-holding finger movable in each passage, nail-bending means, and means for delivering the bent nails to the jack-passages.

31. In a heel-attaching machine, a jack provided with curved passages, drivers movable in the passages, a nail-holding finger movable in each passage, nail-bending means, means for delivering the bent nails to the jack-passages, and means for withdrawing all the fingers from the passages for the reception of the nails.

32. In a heel-attaching machine, the combination with a frame, of nail-bending mechanism carried thereby, work-clamping means, and a jack movable upon the frame between a nail-receiving position at the bending mechanism and an operating position at the clamping means.

33. In a heel-attaching machine, the combination with a frame, of nail-bending mechanism carried thereby, a reciprocatory actuating member, and a jack having nail-passages containing reciprocatory drivers and being movable upon the frame between a nail-receiving position at the bending mechanism and a position in which the drivers are under the influence of the actuating member.

34. In a heel-attaching machine, the combination with a frame, of nail-bending mechanism carried thereby, a reciprocatory actuating member, a jack having nail-passages containing reciprocatory drivers and being movable upon the frame between a nail-receiving position at the bending mechanism and a position in which the drivers are under the influence of the actuating member, and holding members movable upon the jack into and out of engagement with the nails in the passages.

35. In a heel-attaching machine, the combination with a frame, of nail-bending mechanism carried thereby, a reciprocatory actuating member, a jack having nail-passages containing reciprocatory drivers and being movable upon the frame between a nail-receiving position at the bending mechanism and a position in which the drivers are under the influence of the actuating member, holding members movable upon the jack into and out of engagement with the nails in the passages, and means associated with the bending mechanism for moving the holding members out of nail-engaging relation.

36. In a heel-attaching machine, the combination with nail-inserting mechanism, of a die in which are nail-forming recesses, bending members movable into engagement with the nails in the recesses, and means for simultaneously moving all the bending members.

37. In a heel-attaching machine, the combination with nail-inserting mechanism, of a die in which are nail-forming recesses, bending members movable into engagement with the nails in the recesses, a segment extending about the die and acting upon the bending members, and means arranged to oscillate the segment.

38. In a heel-attaching machine, the combination with nail-inserting mechanism, of a die in which are nail-forming recesses, bending members movable into engagement with the nails in the recesses, and a movable nail-retaining shutter co-operating with the die-recesses.

39. In a heel-attaching machine, the combination with nail-inserting mechanism including a movable jack, of a die in which are nail-forming recesses, bending members movable into engagement with the nails in the recesses, and a movable nail-retaining shutter co-operating with the die-recesses, the jack acting upon the shutter to effect its movement.

40. In a heel-attaching machine, a jack movable into and out of operating position and having nail-receiving passages, nail-holding members co-operating with the passages, and means acting upon the members only when the jack is out of operating position for rendering said members ineffective.

41. In a heel-attaching machine, a jack having nail-receiving passages, nail-holding members movable in the passages, releasing members contacting with the holding members, one of the releasing members being movable by such contact, and means for transmitting the movement of said releasing member to the associated releasing members to cause their movement.

42. In a heel-attaching machine, a jack having rear and side nail-receiving passages, nail-holding members movable in the passages, a releasing member contacting with the holding member in the rear passage, releasing members for the side-holding members, and connections communicating the movement of the rear releasing member to the side releasing members.

JOHN T. LANCASTER.